United States Patent Office 3,347,802
Patented Oct. 17, 1967

3,347,802
WATER SOLUBLE POLYMER OF DIGLYCIDYL ETHER AND AN ALKYLENEDIAMINE HYDROHALIDE
Theodore L. Ashby and Clarence R. Dick, Lake Jackson, Tex., assignors to The Dow Chemical Company, Midland, Mich., a corporation of Delaware
No Drawing. Filed July 31, 1964, Ser. No. 386,731
3 Claims. (Cl. 260—2)

ABSTRACT OF THE DISCLOSURE

The invention of this application involves a water soluble crosslinked polymer resulting from the reaction of approximately equal molecular quantities of diglycidyl ether and an alkylenediamine hydrohalide having the general formula:

$$H_2N-R-NH_2 \cdot HX$$

where X is selected from the group consisting of chlorine, bromine and iodine, and R is a divalent hydrocarbon radical containing from 2 to 4 carbon atoms, said polymer produced by adding diglycidyl ether to an aqueous solution of said alkylenediamine hydrohalide at a rate approximately equal to that at which said diglycidyl ether reacts with said alkylenediamine hydrohalide.

---

This invention relates to cross-linked, water soluble polymers obtained by reacting diglycidyl ether with an approximately equal molecular amount of the hydrohalide of an alkylenediamine.

Diglycidyl ether, i.e. bis(2,3-epoxypropyl) ether, can be reacted with certain adducts of alkylenediamine to produce high molecular weight cross-linked polymers which are water soluble and useful as flocculating agents.

The alkylenediamine adducts which are reacted with the diglycidyl ether may be represented by the general formula:

$$H_2N-R-NH_2 \cdot HX$$

where X is a halogen selected from the group consisting of chlorine, bromine and iodine, and R is a divalent hydrocarbon radical containing from 2 to 4 carbon atoms. Suitable compounds in this group include ethylenediamine hydrochloride, ethylenediamine hydrobromide, ethylenediamine hydroiodide, propylenediamine hydrochloride, propylenediamine hydrobromide, propylenediamine hydroiodide, butylenediamine hydrochloride, butylenediamine hydrobromide and butylenediamine hydroiodide.

The method of preparing these water soluble polymers can be understood by referring to the following examples.

EXAMPLE 1

A stirred reactor was charged with 183 parts by weight of ethylenediamine hydrochloride. The temperature in the reactor was raised to 60° C. then diglycidyl ether was added slowly for one hour and 15 minutes. At that time 49.2 parts by weight of water were added. The reaction temperature was maintained at 60° C. and the slow addition of diglycidyl ether was continued for one hour and 20 minutes. 61.5 parts of water were added and the reactor temperature maintained at 65° C. for 45 minutes. At the end of that time 332.5 parts of water were added and after 40 minutes the total diglycidyl ether which had been added reached 260.3 parts by weight. The mixture was digested by maintaining the reaction temperature and stirring for 20 minutes then 886.6 parts of water were added and the mixture was digested for a final one hour and 15 minutes. The product was a light yellow gel. A solution containing about 20 parts per million (p.p.m.) of the solvent-free product and 5 weight percent arrow root starch flocculated the starch at 12 inches per minute.

EXAMPLE 2

Following the procedure of Example 1, a pale yellow gel was prepared from 145 parts of ethylenediamine hydrochloride, 195 parts of diglycidyl ether and 981 parts of water. The reaction was conducted at 50° C. for a total time of 2 hours and 58 minutes. A solution containing 20 p.p.m. of the solvent-free product flocculated silica at 3.3 inches per minute and starch at 11 inches per minute.

In producing the product of this invention, it is essential that the diglycidyl ether be added to the alkylenediamine hydrohalide slowly as the reaction proceeds. When the reaction mixture contains a substantial concentration of unreacted or monomeric diglycidyl ether, the amine catalyzes the homopolymerization of the ether. In each of the above examples the reaction was conducted in an aqueous system. The product can be made without the use of a solvent or in the presence of polar solvents such as alcohols, glycols and ketones. The presence of the water as a solvent for the reaction mixture tends to accelerate the reaction and make it go further toward completion. Also, the flocculant activity of the product is better when it is prepared in the presence of water.

In preparing this flocculating agent it is desirable to react approximately equimolar quantities of the diglycidyl ether and alkylenediamine hydrohalide or up to about ten percent excess of the diamine. The reaction can be conducted at a temperature from 25° C. to 80° C. or preferably between 35° and 50° C. The digestion step following the mixing of the diglycidyl ether with the diamine may be conducted at the same temperature as the initial reaction. Digestion is continued until substantially all of the epoxide groups have been reacted.

We claim:

1. A water soluble, cross-linked polymer consisting essentially of the reaction product of approximately equal molecular quantities of diglycidyl ether and an alkylene diamine adduct having the general formula:

$$H_2N-R-NH_2 \cdot HX$$

where X is selected from the group consisting of chlorine, bromine and iodine, and R is a divalent hydrocarbon radical containing from 2 to 4 carbon atoms said polymers produced by adding said diglycidyl ether to an aqueous solution of said alkylenediamine adduct at a rate approximately equal to that at which said diglycidyl ether reacts with said alkylenediamine adduct while maintaining the reaction system at a temperature between about 25° C. to 80° C.

2. A water soluble, cross-linked polymer according to claim 1 wherein said alkylene diamine adduct is ethylenediamine hydrochloride.

3. A water soluble, cross-linked polymer according to claim 1 wherein said diglycidyl ether is reacted with said alkylene diamine adduct in an aqueous solution.

References Cited

UNITED STATES PATENTS

| | | | |
|---|---|---|---|
| 2,500,600 | 3/1950 | Bradley | 260—47 |
| 2,772,248 | 11/1956 | Lieberman et al. | 260—47 |
| 2,965,517 | 12/1960 | Albercht et al. | 260—29.2 |

SAMUEL H. BLECH, *Primary Examiner.*

WILLIAM H. SHORT, *Examiner.*

T. PERTILLA, *Assistant Examiner.*